(12) United States Patent
Sisk (10) Patent No.: US 8,807,529 B2
(45) Date of Patent: Aug. 19, 2014

(54) HANDLE EXTENSION FOR BUTTERFLY VALVE

(75) Inventor: David E. Sisk, Bonne Terre, MO (US)

(73) Assignee: Bulk Tank, Inc., Park Hills, MO (US)

( * ) Notice: Subject to any disclaimer, the term of this patent is extended or adjusted under 35 U.S.C. 154(b) by 0 days.

(21) Appl. No.: 13/506,246

(22) Filed: Apr. 6, 2012

(65) Prior Publication Data
US 2012/0241657 A1 Sep. 27, 2012

Related U.S. Application Data (63) Continuation-in-part of application No. 29/372,801, filed on Jan. 13, 2011, now Pat. No. Des. 678,471, and a continuation-in-part of application No. 29/372,802, filed on Jan. 13, 2011, now Pat. No. Des. 678,472, and a continuation-in-part of application No. 29/372,803, filed on Jan. 13, 2011, now Pat. No. Des. 678,473.

(60) Provisional application No. 61/517,200, filed on Apr. 18, 2011.

(51) Int. Cl.
*F16K 31/00* (2006.01)

(52) U.S. Cl.
USPC ............ 251/293; 251/308; 251/305; 251/366

(58) Field of Classification Search
USPC .......................... 251/305, 307, 308, 293, 366
See application file for complete search history.

(56) References Cited

U.S. PATENT DOCUMENTS

| | | | | |
|---|---|---|---|---|
| 1,603,455 A | * | 10/1926 | Dow | 251/228 |
| 3,100,500 A | | 8/1963 | Stillwagon | |
| 3,334,650 A | | 8/1967 | Lowery et al. | |
| 3,378,224 A | * | 4/1968 | Boyle | 251/14 |
| 3,452,766 A | * | 7/1969 | Fenster | 137/68.14 |
| 3,549,123 A | * | 12/1970 | Bell et al. | 251/306 |
| 3,778,028 A | | 12/1973 | Graves et al. | |
| 3,904,173 A | | 9/1975 | Naylor | |
| 4,093,180 A | * | 6/1978 | Strabala | 251/248 |
| 4,756,507 A | * | 7/1988 | McAndrew | 251/292 |
| 5,269,492 A | * | 12/1993 | McLennan | 251/229 |
| 5,356,116 A | * | 10/1994 | Morgan et al. | 251/308 |
| 5,360,030 A | | 11/1994 | Sisk | |
| 5,482,251 A | * | 1/1996 | Roberts | 251/288 |
| 5,842,681 A | | 12/1998 | Sisk | |
| 6,786,362 B2 | | 9/2004 | Sisk | |

* cited by examiner

*Primary Examiner* — John K Fristoe, Jr.
*Assistant Examiner* — Marina Tietjen
(74) *Attorney, Agent, or Firm* — Paul M. Denk (57) ABSTRACT

A butterfly valve for use with a tank trailer includes housing, a lateral extension, a shaft provided through the extension, the back end of the shaft having a seat for accommodating a handle thereon, and further extensions may connect with the first mentioned extension. The handle turns the butterfly valve between opened and closed positions.

9 Claims, 8 Drawing Sheets

HANDLE EXTENSION FOR BUTTERFLY VALVE

CROSS REFERENCE TO RELATED APPLICATIONS

This utility patent application claims priority to the provisional application having Ser. No. 61/517,200, filed on Apr. 18, 2011; this application is a continuation-in-part of the U.S. patent application Ser. No. 29/372,801, filed on Jan. 13, 2011 now U.S. Pat. No. D678,471; this application is also a continuation-in-part of the U.S. patent application Ser. No. 29/372,802, filed on Jan. 13, 2011; now U.S. Pat. No. D678,482 and, this application is a continuation-in-part of the application Ser. No. 29/372,803, filed on Jan. 13, 2011, now U.S. Pat. No. D678,473 all of said applications being owned by a common assignee.

FIELD OF THE INVENTION

This invention relates to an extension to a butterfly valve that is structured into the discharge port of a tank trailer, or other conveying vessel, and incorporates means for disposing its operating mechanism; that is normally manually manipulated, into a position where it can be conveniently turned by the operator between its closed and discharging positions. In other words, this invention greatly facilitates the ability of one to manipulate a butterfly valve during its usage.

BACKGROUND OF THE INVENTION

Butterfly valves have been used at the base of tank trailers, or even railroad cars, as a means to prevent the untimely discharge of the conveying cargo, whether it be grains, polymer beads, or other flowable materials, in order to provide the means for preventing the unauthorized and untimely discharge of the conveying load, but at the same time, through their manipulation into an opened position, allows for prompt discharge of such materials. Currently, before this invention, the operator of the vehicle was required to climb under the tank trailer and in the early days, apply a wrench to the butterfly valve shaft, and forcefully turn it at least a quarter turn, in order to provide for an opening, or closing, of the valve, during its manipulation and operation. The problem with such structure was its accessibility, because the operator was required to crawl deeply under the vehicle, to get access to the shaft, and to attain its manipulation, during usage. During inclement weather, obviously, it is a dirty job, but, regardless of the weather, it was still predominantly a difficult task, if not even to so extent potentially hazardous, to be so close to the point of discharge, of the bulk granular material during it's processing.

While substantial design and development of the configuration of the butterfly valve has taken place over the years, as for example, since the conveying material may be a potential food product, the butterfly valve had to work completely effectively to prevent the entrance of any insects, vermin or rodents, into the tank trailer, and thereby obtaining a contaminating access to the conveyed load. Thus, the butterfly valves were designed to prevent that type of access, and to function to completely clean out the conveying tank trailer, since leaving any of the previous load intact, even a singular grain of a polymer bead that may be used in blow molding of vessels, a singular bead could containment and prevent the usage of any vessels or bottles molded from the previous load, if contamination occurred. For example, if white polymer beads, for use for injecting and blow molding, are conveyed in a current load, and the previous load had black polymer beads, with one of the black beads remaining and intermixing with the white beads can completely contaminate and prevent the usage of any bottles molded, as for example, milk jugs, since black streaks may be present in any currently molded bottles due to previous contamination. Thus, substantial investment of time, research, and funds were made to prefect the butterfly valve, but gave little or no thought to the convenience of the vehicle operator, when required to manipulate such valves during their functioning.

As a result, the current invention has been designed to give consideration to the safety and convenience of the vehicle operator, to facilitate his/her manipulation of such valves, when arriving at the site of refilling of a tank trailer, or to attain it's unloading.

Examples of prior art butterfly valves can be seen in the previous patent to Sisk, the inventor herein, as shown in his U.S. Pat. No. 5,360,030, disclosing a butterfly valve incorporating sleeve seals. Other examples of butterfly valves used in pipelines include U.S. Pat. No. 3,100,500, upon a disc valve with removable seat and unitary stem; U.S. Pat. No. 3,334,650, upon a Valve; U.S. Pat. No. 3,778,028, upon a Lined Butterfly Valve; and, the Butterfly Valve Assembly as shown in U.S. Pat. No. 3,904,173.

An example of a swing-away hopper tee, that is integrated with the tank trailer and rendered operative by means of a butterfly valve, can be seen in the U.S. Pat. No. 6,786,362, to David Sisk, the inventor herein. It can be noted, for example, in its FIG. 3, just how the various operating components that connect with the hopper flange and would swing away to provide clearance, may easily get in the way of its associated operating lever, as noted, which the subject matter of this current invention, through the use of its extension, and contoured handle, clears any such obstruction.

SUMMARY OF THE INVENTION

The concept of this current invention contemplates the formation of a structurally sound extension, that may be integrally formed with or attached to the types of butterfly valves currently used for closure at the discharge port of a tank trailer, or other conveying vessel, and conveniently being disposed far laterally from the applied butterfly valve means for application of a handle, that may be applied for turning the butterfly valve between its position to prevent the discharge of any conveyed materials, or to greatly ease the ability of the operator to open the valve, when unloading is required.

The structure of the current invention includes the annulus or framework that supports the butterfly valve and its gasket therein, centrally of its structure, and then provides for the diametric arrangement of the valve shaft for extension out one side, wherein it may connect with or integrally secure with a shaft extension, to whatever length that is required to dispose its operating handle, at the end of the shaft, and makes for much easier handling by the operator to manipulate the valve, between its closed and open positions, or visa versa, during its usage. Such valves, and their tubular housing, are normally rigidly bolted to an integral flange formed at the bottom of the hopper for the tank trailer, and the thorough support that is provided through bolting the housing at that location provides adequate support for either the connection, or the integral formation of an extension, to the valve housing, in order to dispose its operating shaft, or the end thereof, at a lateral position displaced from underneath of the discharge port of the valve, to make it far more convenient for the operator to attain access to the valve shaft, through the application of a handle, and to attain the quarter turns necessary for opening or closing of the valve, during its usage.

The valve extension may have integrally formed flange(s), to which further extensions may be applied thereto, and further secondary shafts may be axially aligned and connected with the butterfly valve shaft, in order to furnish even further extensions laterally, to the sides of the tank trailer, and to allow the operator to conveniently attach a handle thereto, and to attain its ease of manipulation. Such extensions may include cylindrical like members, having flanges integrally formed or welded to the ends, and these may be to almost any length, as to be reviewed herein. These can then be slid over any shaft extension, and bolted to the valve top plate.

Whatever valve shaft that extends outside of the extension, is that part of the valve that will be connected with an attachable handle, and allows for the manipulation of the butterfly valve much more conveniently for the operator, during usage.

In addition, to assure that the handle remains in place, it may be formed having a fastener, which can secure to the end of the valve shaft, to assure its retention thereon, during usage. In addition, as can be seen in select prior art referenced herein, the handle of this invention may be angulated, structurally, to provide total clearance from any of the operating components of the butterfly valve, particularly where it may be incorporated into the swingaway style of valve, as known in the art.

In view of the forgoing, it is the principal object of this invention to provide an operating handle that may secure with a butterfly valve, as beneath a tank trailer or other conveying vehicle, to facilitate the opening and closing of such a valve, by the operator, as required.

Another benefit of this invention is to provide means for greatly facilitating the ability of the vehicle operator to provide for loading, and unloading, of a tank trailer, during usage.

Still another object of this invention is to provide a butterfly valve housing, with an integrated extension, that makes it far more convenient to secure a handle, and to attain its operations, when maneuvering a butterfly valve between a loading and unloading positions.

Still another object of this invention is to provide structure that allows for the addition of further extensions, to the butterfly valve housing, and its operating shaft, to make it more convenient for the operator to manipulate the same.

Yet another object is to provide means for operating a butterfly valve, which furnishes greater clearance from the tank trailer operating structures in the vicinity of such an unloading valve, through the usage of a handle that is structured to furnish clearance to such other valve accessories.

Another object of this invention is to provide means to facilitate the operations of a butterfly valve, and which can be just as easily secured into position, between the hopper flange, and the unloading tee flange, underneath a tank trailer.

Yet another object is to provide a butterfly valve incorporating its valve shaft, which is structured to provide for its interconnection with additional valve shaft extensions, to provide further clearance for the operative components of a tank trailer butterfly valve.

Still another object of this invention is to provide a butterfly valve, with its integral extensions, such that when it handle is applied, it clears any hopper cone during its maneuvering.

Another improvement to this invention is to provide the usage of extensions, of varying lengths, and which incorporate their valve shaft extensions, that may be secured and placed for disposition of the valve handle remotely from the operating butterfly valve.

Yet another object is to provide a butterfly valve and its various extensions that incorporate bushings to facilitate the pivot of the valve during its usage.

A further object is to provide valve extensions that are structurally reinforced to assure long standing and continuous usage against any fracture or wear out.

Still another object of this invention is to provide means for retaining the valve shaft extension in place within it integral valve extension, or in any secondary and axially aligned extensions that may be applied thereto.

These and other objects may become more apparent to those skilled in the art upon review of the summary of the invention as provided herein, and upon undertaking a study of the description of its preferred embodiments, in view of the drawings.

Other variations and modifications to the subject matter of this invention may be considered to those skilled in the art upon review of the invention as described herein. The ideas presented are not intended to limit the scope or application of the device, or its method of usage.

DESCRIPTION OF THE PREFERRED EMBODIMENT

In referring to the drawings, and in particular FIGS. 1 thru 7, therein is shown the butterfly valve 100 of the type that incorporates the butterfly valve housing 101, its mounted gasket 102, and its butterfly valve 103 provided therein. The pivotal mounts 104 and 105 are shown, and which provide the means for pivoting of the butterfly valve 103 between its open and shown closed positions. When closed, as known, the butterfly valve is in a sealed relationship with its gasket, and prevents the discharge of any material from the tank trailer, etc. The various flanges 106 are shown, and these flanges provided for mounting of the butterfly valve for installation to the underside of the discharged chute of the tank trailer (not shown), as known in the art.

Figure 1:
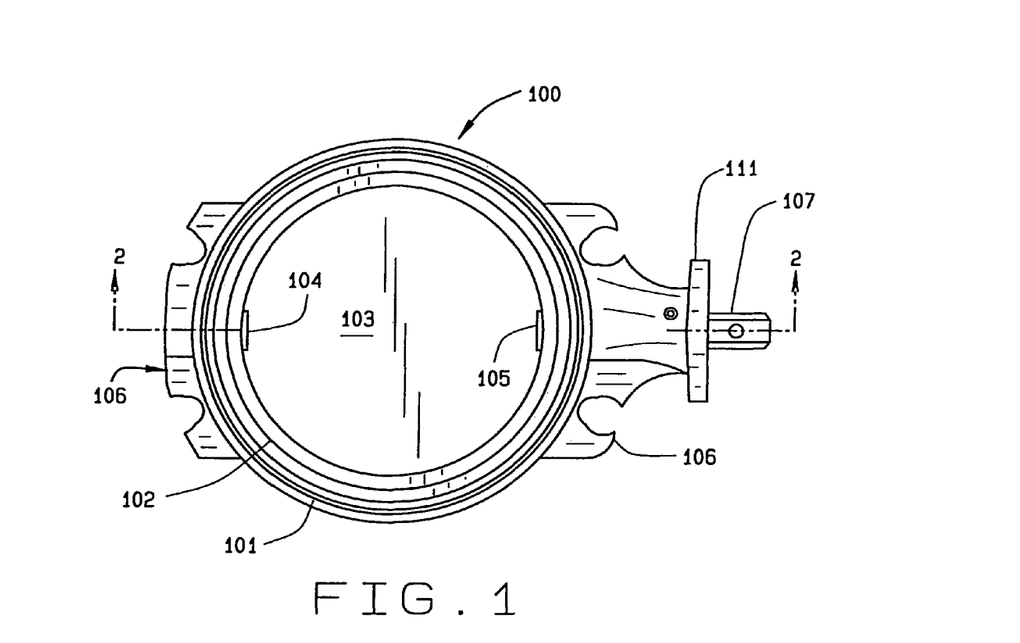
FIG. 1 is a plan view of the butterfly valve with its integral valve operating stem.
Figure 2:
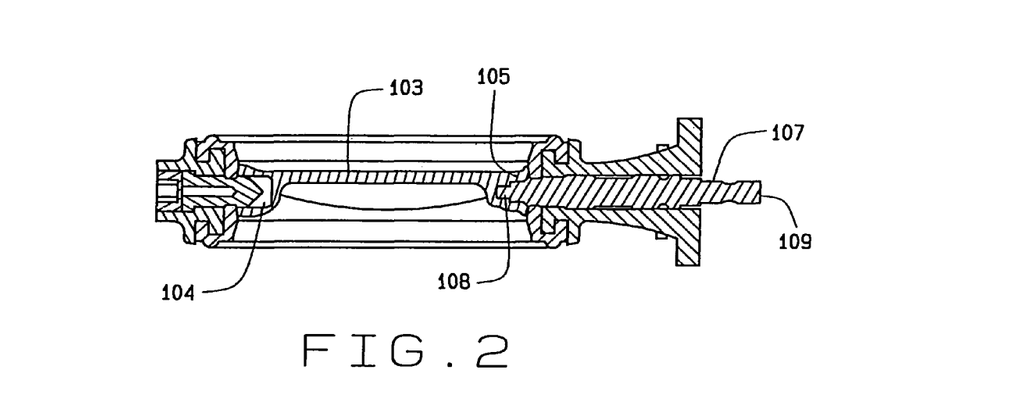
FIG. 2 is a sectional view of the butterfly valve of FIG. 1, taken along the line 2-2 as noted.

A short length of shaft 107 extends from the butterfly valve, and as can be seen in FIG. 2, it engages within a socket, as at 108, to provide for pivoting of the butterfly valve, when an instrument or tool is applied to the end 109 of the shown shaft.

Figure 3:
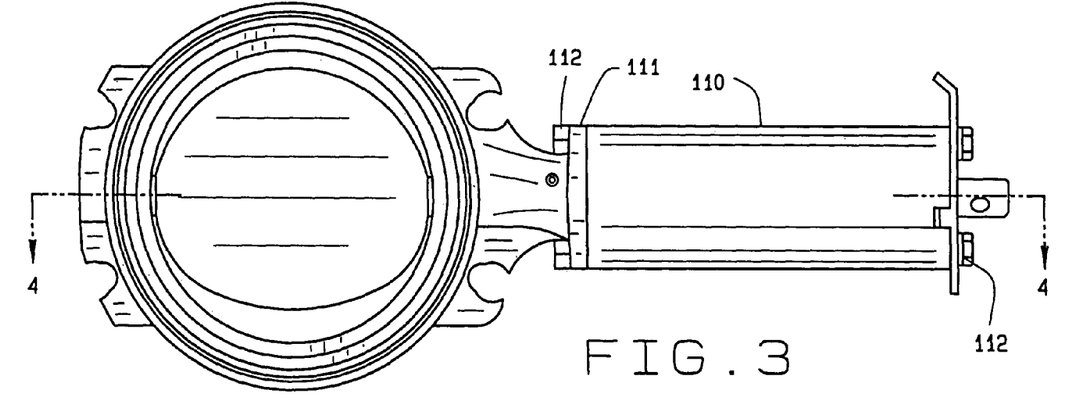
FIG. 3 is a plan view of the butterfly valve with its extension connected thereto, as noted.
Figure 4:
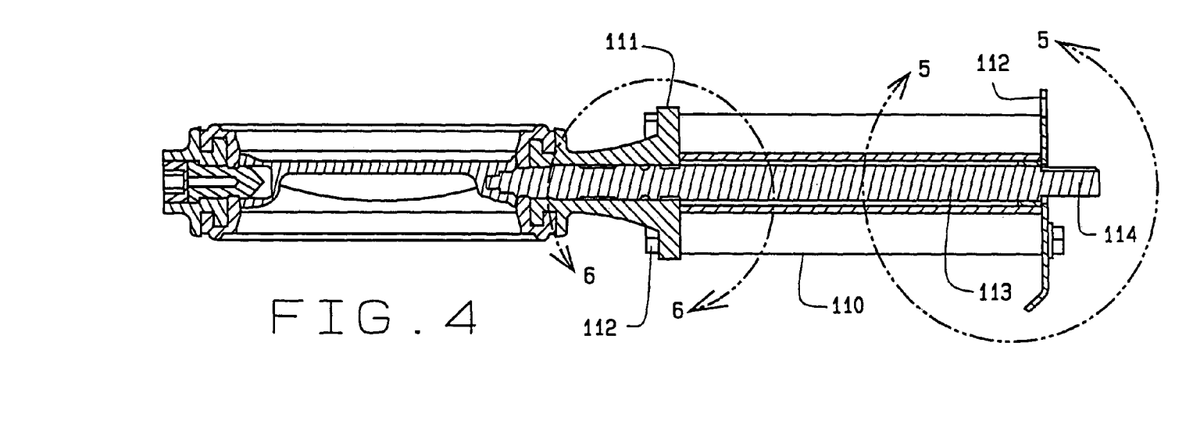
FIG. 4 is a sectional view of the butterfly valve with the extension of FIG. 3, taken along the line 4-4, as noted.
Figure 5:
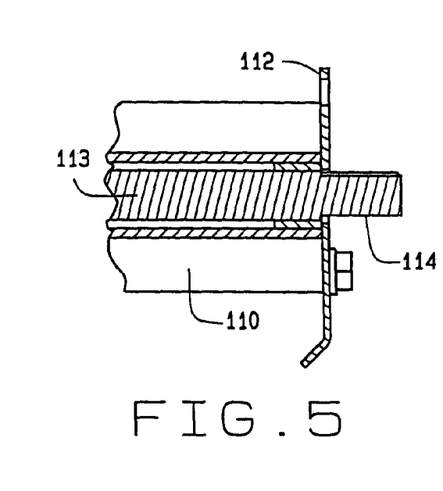
FIG. 5 is an end view of the extension showing its projecting shaft that can be manipulated by a wrench or actuator.
Figure 6:
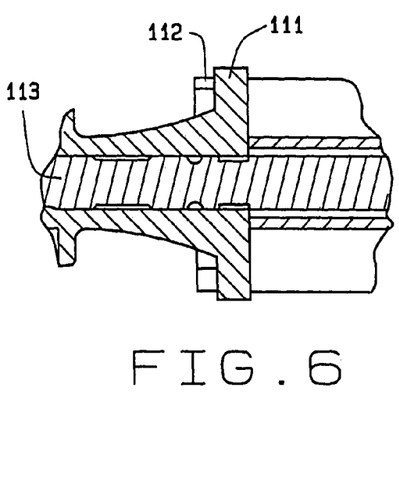
FIG. 6 is a sectional view taking along the line 6-6 of FIG. 4, showing where the extension interconnects with the neck of the butterfly valve.

As can be seen in FIGS. 3 and 4, the extruded handle extension 110 is shown connecting to the flanged extension plate 111 of the butterfly valve. It includes a cylindrical like housing, as noted in FIG. 4, and which has connected to its ends the neck extension flange 112, to allow for interconnection and bolting of the various components of the extension to the butterfly valve structure.

As can also be noted in FIG. 4, the valve extension shaft 113 is inserted within the extrusion 110, in order to accommodate the extension to the butterfly valve, and may replace the butterfly valve standard shaft 109 (see FIG. 2) and locate within the socket area 108 of the valve, and extend all the way through the cylindrical extruded housing 110, for extension of its end 114 out of the valve extension, as noted.

Thus, as can readily be seen within these figures, the entire extruded extension 110 can be substituted for the standard shaft 107, of a butterfly valve, with the extended shaft 113, being immediately mounted through the valve shaft extension 110, to provide for interconnection of any length extension thereto, that greatly facilitates the use and operation of the butterfly valve, during the application. This has previously been summarized.

Figure 7:
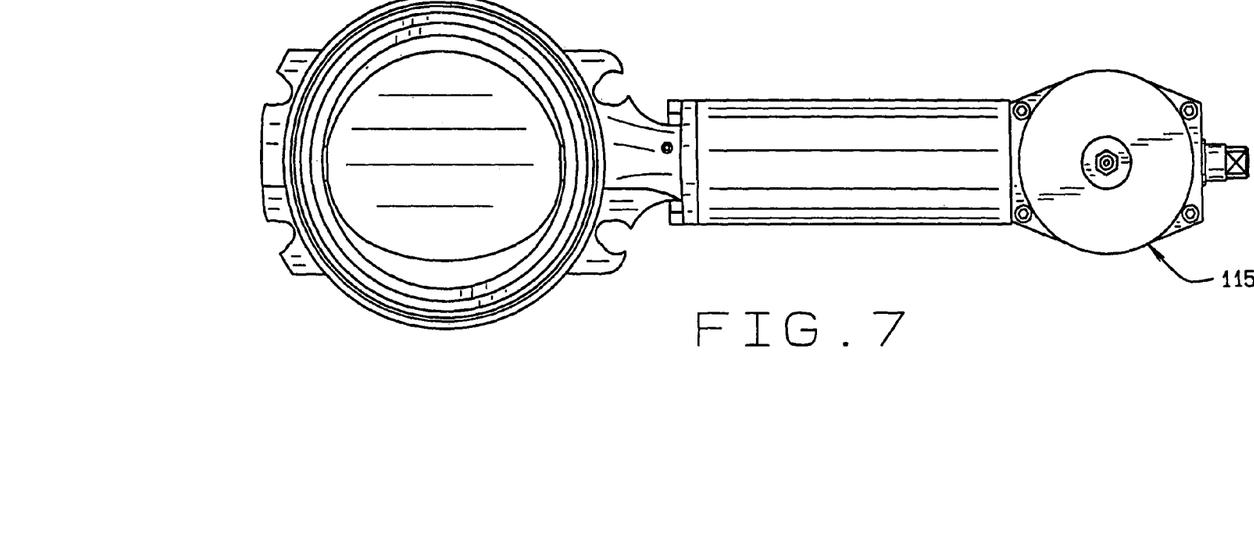
FIG. 7 is a plan view of the butterfly valve, with extension, and showing the connection of an actuator thereto for providing automatic operations of the butterfly valve.

In addition, as can be seen in FIG. 7, the extension, and its shaft 114 (see FIG. 4) may have attached thereto an actuator 115, which may provide for automatic operations of the butterfly valve, during its usage and application.

Figure 8:
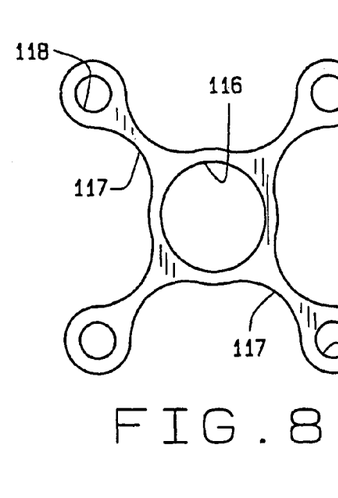
FIG. 8 shows an end view of the extruded butterfly valve neck extension.
Figure 9:
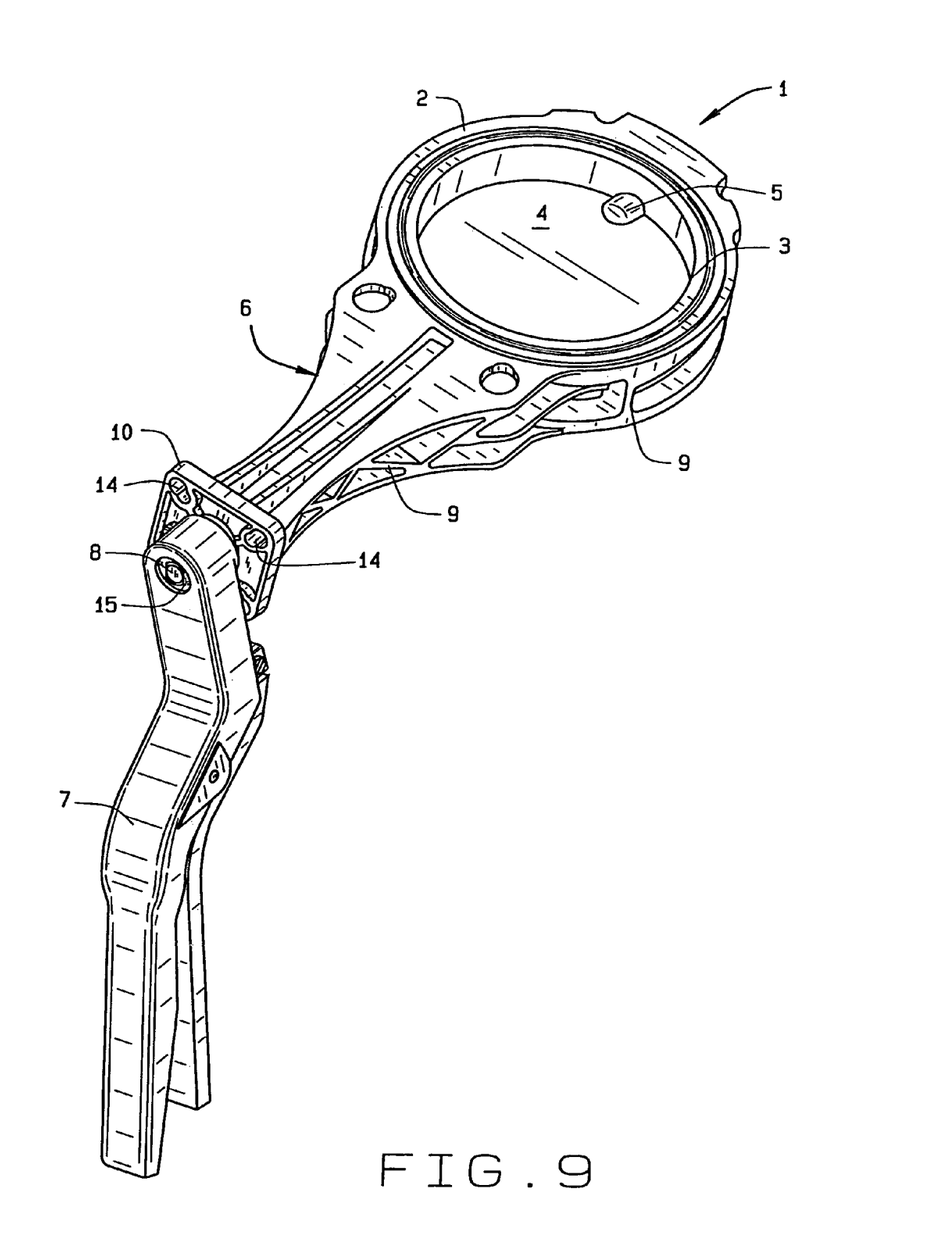
FIG. 9 is an isometric view of a modified valve handle extension showing a handle applied thereto.
Figure 10:
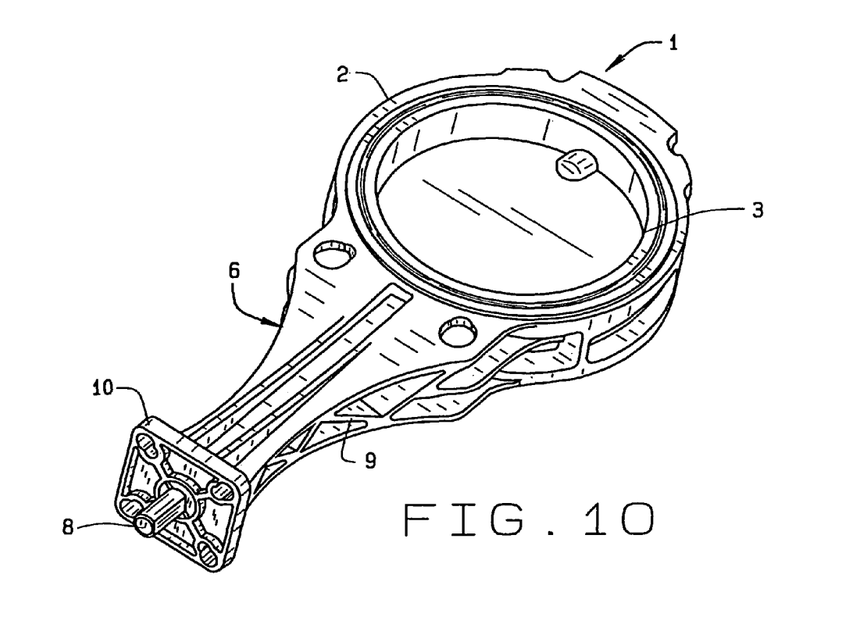
FIG. 10 is an isometric view of the valve extension of FIG. 9.
Figure 11:
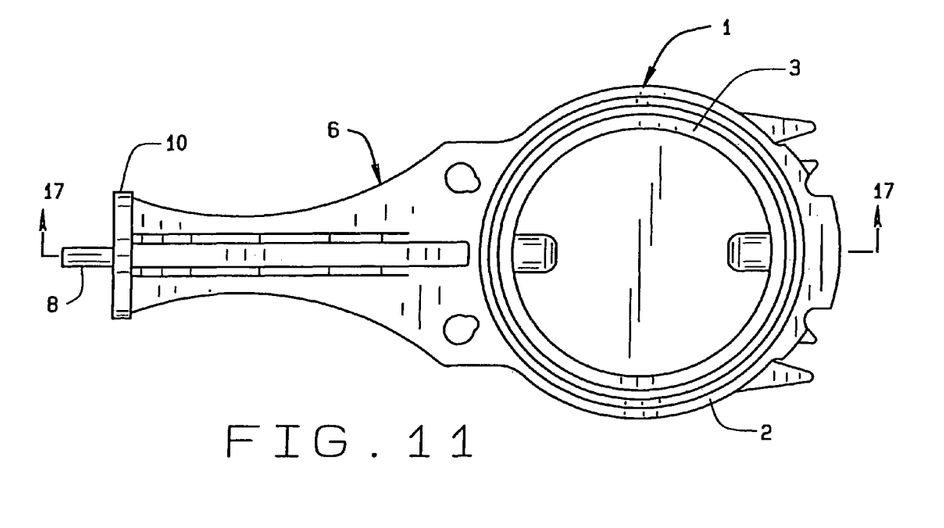
FIG. 11 is a plan view of the valve extension of FIG. 10.
Figure 12:
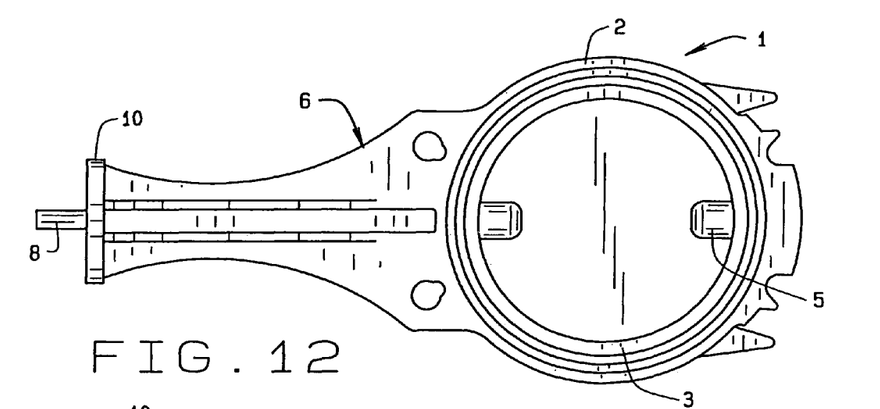
FIG. 12 is a bottom view.
Figure 13:
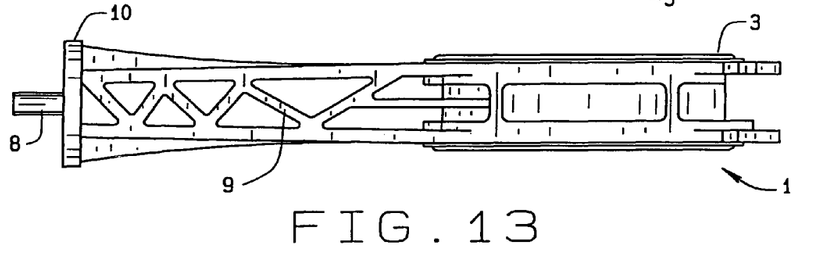
FIG. 13 is a right side view.
Figure 14:
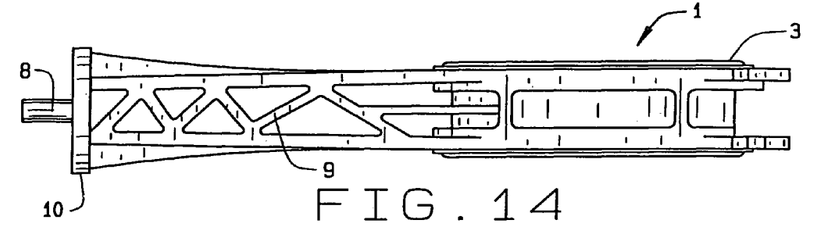
FIG. 14 is a left side view.
Figure 15:
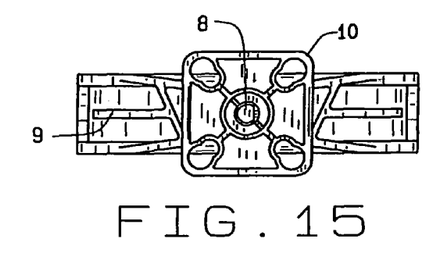
FIG. 15 is a back view of the valve extension, showing its neck extension plate.
Figure 16:
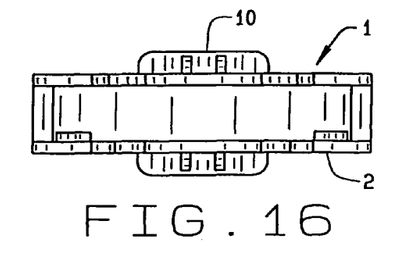
FIG. 16 is a front view of the valve housing.

The actual cross-sectional shape of the extension is as shown in FIG. 8, and is a cylindrical extension that is provided for the butterfly valve. The uniqueness of this is that this extruded shape can be purchased in substantial lengths, and then cut off at that length specified by the customer for the length of extension desired for application to a butterfly valve mounted to its tank trailer. Thus, that extension may be an integral extrusion, that incorporates a central cylindrical opening, as at 116, and through which the valve shaft extension 113 locates, while the integral arms 117 provided around the perimeter, and extending radially therefrom, each incorporate the bolt holes 118, through which fasteners may be secured, for attachment of the extension to the butterfly valve extension plate 111, or for attachment by bolts thereto.

In referring further to the drawings, and in particular FIGS. 9 thru 16, therein can be seen a modified butterfly valve tubular housing 1 which includes normally an annulus housing 2 that incorporates a valve gasket 3 therein and which embodies the butterfly valve 4 that is supported for pivotal movement by means of the shafts 5 within said housing. Normally, as previously referred to in the U.S. Pat. No. 5,360,030, a short length of shaft (not shown) is provided extending laterally from the housing, diametrically opposite from the stub shaft 5, and which has a handle applied thereto for its pivotal manipulating between open and closed positions. Such a handle can be seen in the previously referred to U.S. Pat. No. 5,842,681.

In this particular instance, with this invention, it is desired to provide for an extension to the valve housing, and the extension 6 extends for that length of distance desired for the butterfly valve that would conveniently locate its manipulative handle 7 with some degree of remoteness, to add adequate clearance for any other operating components associated with the valve, as previously reviewed, and furthermore, to place the handle more conveniently to the side of the tank trailer, where the operator can have immediate access thereto, to attain its opening, and closing, through the pivotal manipulation of the handle, and its connected valve shaft 12 during usage. It can be seen that the valve housing, and its extension, is adequately reinforced with integral braces, such as the diagonal braces 9, as can be noted, to add structural reinforcement to the valve, and its integral extension, to assure its longevity of usage. Bear in mind that the valve housing, and its extension 6, are normally located beneath the hopper of the tank trailer, as can be understood, and therefore, will be subject to exposure to flying rocks, and other debris, that the tank trailer may encounter while driven over the highway, and therefore, such reinforcement is preferred.

As can also be seen, the extension for the butterfly valve includes a neck extension plate 10 that is conveniently disposed for application of further secondary extensions to the valve, and further extensions to the valve shaft 12, when it may be desired to locate the operating handle even further to the side, for the convenience of the driver or operator.

The actual structure of the handle 7, can be better visualized, and its method of usage and operation, upon reviewing the Pat. No. D678,472, issued on Mar. 19, 2013.

It may be commented that the butterfly valve housing and its extension 6 normally will be molded from a metallic material, such as steel, but preferable aluminum, the latter providing for a more light weigh butterfly valve, one that can be more easily handled during its installation, and more facile of operation, during its usage, particularly when applying the handle to rotate the butterfly valve between its open and closed positions. Furthermore, the extensions that are built into and integrally formed with the valve housing may be to any length desired, but normally will be in the preferred length of somewhere between six to twelve inches in length. If further extensions are required, such will be explained further in this application.

Figure 17:
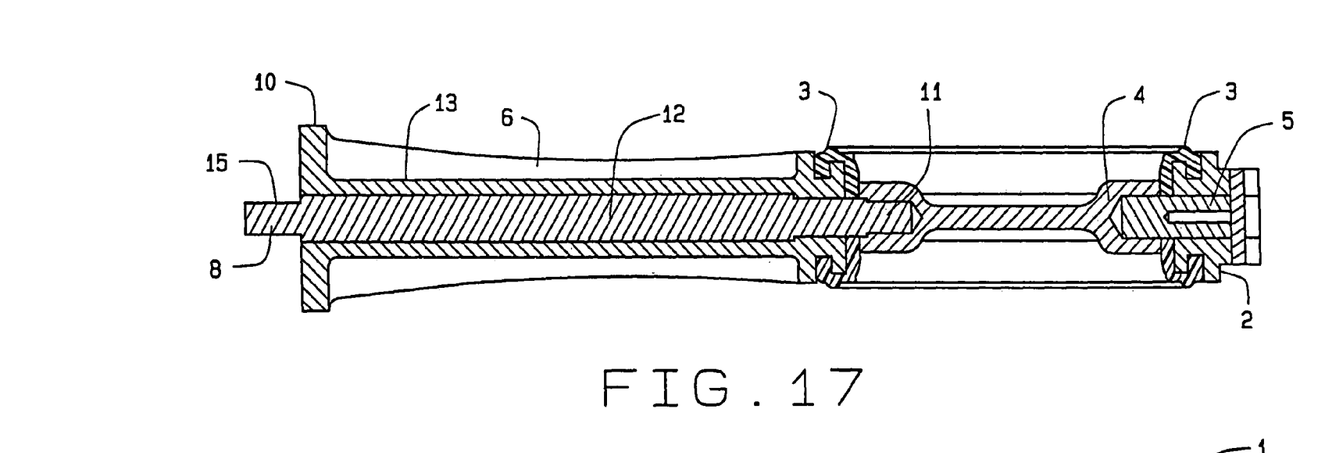
FIG. 17 is a sectional view of the valve extension taken along the line 17-17 of FIG. 11.

A cross section to the valve housing and its integral construction can be seen in FIG. 17. As disclosed, the valve gasket 3 mounts upon the tubular valve housing 2 normally in a manner as known in the art. The stub shaft 5 for the butterfly valve is connected with the interior of the housing 2, extends through the gasket, and rigidly connects thereto with the butterfly valve 4 as can be noted. Thus, when the butterfly valve 4 is turned, it pivots with its pivot pins 5, and 11, that latter being an extension of its shaft 12 that is provided through the length of the integral extension 6, as previous explained. The extension 6 includes a cylindrical housing 13 that has an opening provided axially therethrough and the extension shaft 12 locates therein, and is capable of being pivoted, to attain the necessary turning of the butterfly valve 4, as can be understood. The front end 11 of the shaft 12 fits within a socket formed of the butterfly valve, to assure that both will turn simultaneously during usage.

The back end of the extension 6 includes its neck extension plate 10, as previous explained, and the flange includes a series of apertures 14 (FIG. 9) that may accommodate fasteners therethrough when it is desired to add further extensions to the butterfly valve, when necessary. The back end of the shaft 12, as at 8, includes a flatten surface(s), as at 15, which is designed for accommodating of the handle 7 (FIG. 9) thereon, and it may further include a shallow dimple, upon which a bolt or other fastener operatively associated with the handle may be tightened, to secure the handle to the end 8 of the shaft 12, for more permanent fixation.

Figure 18:
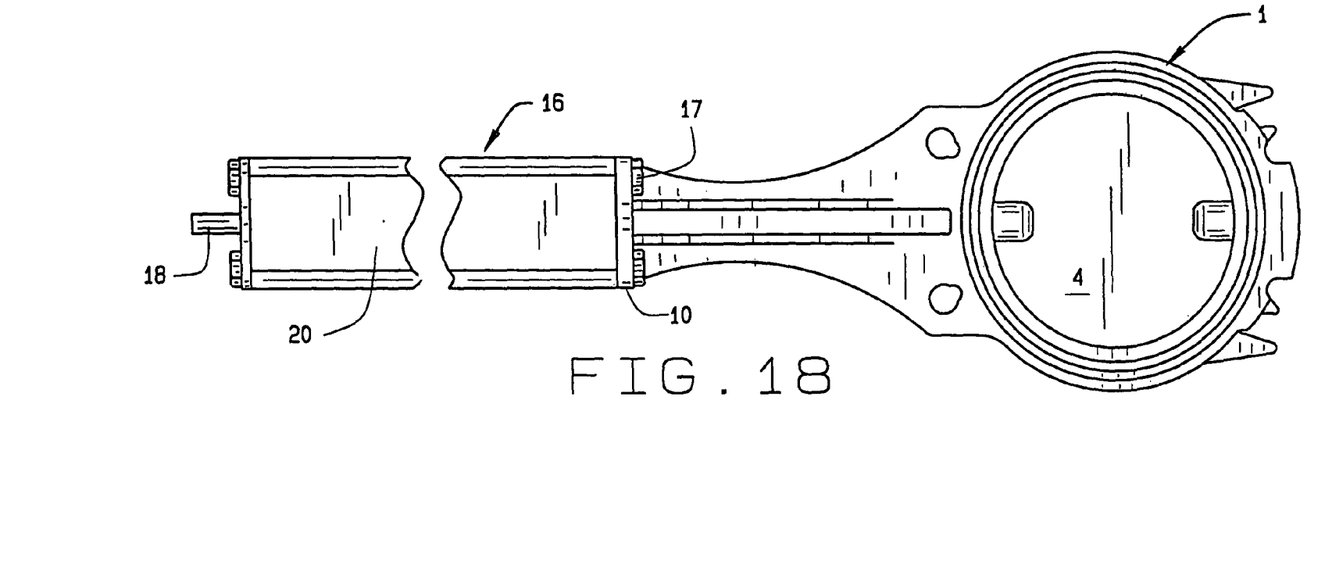
FIG. 18 is a view of the valve handle extension, with a secondary extension axially secured thereto to provide additional length for connection of the operation handle.

As can be seen in FIG. 18, and as previous alluded to, if further extension is required for the valve 4, secondary extensions, such as shown at 16, may be applied. This is achieved through the use of bolts, or other fasteners, as at 17, that secures with the neck extension plate 10 and further secures the extension 16 thereto, as may be desired. A secondary shaft 18 extends through the further extension 16, and couples with the end 8 of the extension shaft 12, to provide for an interconnection between the two, their maintenance in longitudinal and axially alignment, so that when the shaft 18 is turned, by application of a handle 7 thereto, it will also pivot the butterfly valve 4 between its open and closed positions, as may be desired.

Figure 19:
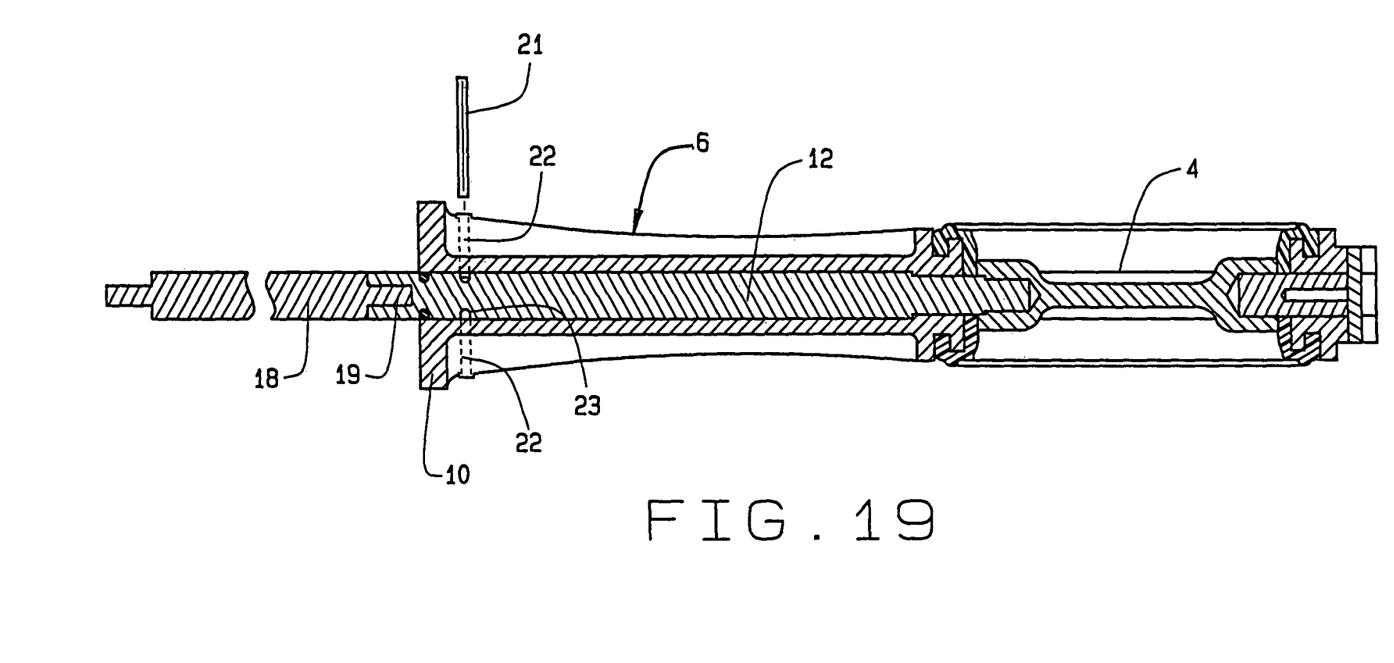
FIG. 19 is a sectional view of the valve with integral extension and showing how additional valve shafts may be connected thereto and held in position through the usage of retaining pins.

FIG. 19 discloses further details of the connection of the additional shaft 18 during its installation to the extension shaft 12, and it can be seen how the interconnection, as at 19 is made between these two components. Then, a further tubular type housing, as noted at 20 (FIG. 18), can be applied thereon, bolted to the neck extension plate 10, to secure these components together. Furthermore, to assure that the shaft 12 remains in place, within its extension 6, a pin 21 may locate through a lateral aperture, as at 22, and locate along the groove 23 surrounding the shaft 12, to prevent the shaft 12 from longitudinally sliding, and to fix it in its position as shown in said FIG. 19, but yet allow the shaft to be turned, when force is applied to the handle 7, to operate the butterfly valve 4.

These secondary extensions 16 may be made to any desired length, and such lengths may be made available anywhere from six inches, even up to seventy-two inches, depending upon the circumstances for location of the butterfly valve upon the hopper of the tank trailer, or even a railroad car. Particularly, where a railroad car may be involved, substantial additional length for the extension may be required, in order to locate the handle reasonably near the side of the car, to make it far easier for the trainman to open or close the butterfly valve, as required during a loading or unloading operation.

Furthermore, and with respect to the structure of the valve and its extension, as noted in FIGS. 17 and 19, various bushings may be applied at select locations where the shaft 12 achieves its turning, or where the stub shaft 5 locates within the valve housing 2, and such bushings may be formed of nylon, or other polymer, to facilitate the pivotal manipulation.

Variations or modifications to the subject matter of this invention may occur to those skilled in the art upon review of the development as explained herein. Such variations, if within the spirit of this invention, are intended to be encompassed by any claims to patent protection issuing upon this valve with extension. The description of the preferred embodiment in this application, and it disclosure in the drawings, are primarily set forth for illustrative purposes only.

I claim:

1. A butterfly valve including a butterfly valve housing having a flange extension plate, the butterfly valve member pivotally located therein and capable of turning when manipulated between an open position and a closed position, a valve handle extension having a pair of ends with each end having a neck extension flange for attaching the handle extension to the flange extension plate of the butterfly valve housing, and extending laterally to provide for the application of a valve handle, and to locate the valve handle at a position where an operator can more easily attain access thereto and to achieve turning of the valve handle during usage, said valve handle extension including a cylindrical housing, said cylindrical housing having a longitudinal opening extending through its length, an extension shaft located within said cylindrical housing of the valve handle extension, said extension shaft coupling with the butterfly valve member such that when the extension shaft is turned, the butterfly valve member is manipulated between the open and closed positions, and said extension shaft having an end remote from the butterfly member, said butterfly valve member and the extension shaft are provided with sockets to allow their interconnection together and to provide for their simultaneous turning together, and further comprising a secondary valve handle extension having a pair of ends with each end having a neck extension flange and a secondary shaft extending therethrough, and wherein the extension shaft with the valve handle extension is capable of interconnecting with the secondary shaft to provide for an interconnection and simultaneous turning, said valve handle connecting to the secondary shaft to provide for an interconnection and simultaneous turning by the valve handle during manipulation of the butterfly valve member during usage.

2. A butterfly valve of claim 1, and wherein said cylindrical housing has a lateral opening provided therethrough, and said shaft having a circumferential groove in alignment with the housing opening, and a retaining pin capable of locating within said housing opening to retain said shaft longitudinally within the handle extension, to prevent its longitudinal shifting therein, but also to provide for turning of the shaft during manipulation of the butterfly valve member its open and closed positions.

3. A butterfly valve of claim 2, and including an o ring provided between the valve extension and the secondary shaft to provide a seal to prevent the entrance of any dirt during prolonged usage of the installed butterfly valve during application.

4. A butterfly valve of claim 1 wherein said cylindrical housing is an integrally cast length of extension that includes said longitudinal opening through which the extension shaft is located, and has the flange extension plate extending radially therefrom providing a fastening structure to which the cylindrical housing connects with the butterfly valve, and wherein the butterfly valve member and said valve handle are located at opposite end of the extension shaft, during installation and usage of the butterfly valve.

5. A valve of claim 4, wherein said cylindrical housing is cut to that length desired for the length of the valve handle extension required for the installation of the valve handle extension to the butterfly valve member.

6. A butterfly valve of claim 1, wherein said butterfly valve is formed of aluminum.

7. A butterfly valve comprising:
a valve extension extending from a butterfly valve housing having a butterfly valve member for being pivoted between an opened position and a closed position, the valve extension having a cylindrical housing, a valve shaft having a first end connected to the butterfly valve member and a second end extending out of the cylindrical housing, a neck extension plate having a series of apertures, and integral braces; a secondary extension for connection to the neck extension plate, the secondary extension comprising a housing having a secondary shaft for connection to the second end of the valve shaft, and a valve handle for placement on the second end of the valve shaft for moving the second end for pivoting the butterfly valve member between the opened position and the closed position.

8. A butterfly valve of claim 7, wherein the secondary extension further comprises a neck extension plate for connection of another secondary extension.

9. A butterfly valve of claim 7, wherein the integral braces are diagonal braces.

* * * * *